United States Patent [19]

Hensel et al.

[11] 3,879,457

[45] Apr. 22, 1975

[54] PROCESS FOR THE PRODUCTION OF PURE N-ALKYL FORMAMIDES

[75] Inventors: Jorg Hensel; Gerd Schaefer; Gerd Schreyer, all of Grossauheim, Germany

[73] Assignee: Deutsche Gold- und Silber-Scheideanstalt vormals Roessler, Frankfurt am Main, Germany

[22] Filed: Aug. 29, 1972

[21] Appl. No.: 284,545

[30] Foreign Application Priority Data
Sept. 3, 1971 Germany............................ 2144230

[52] U.S. Cl. ......................... 260/561 R; 260/562 R
[51] Int. Cl. ............................................. C07c 103/30
[58] Field of Search ............................... 260/561 R

[56] References Cited
UNITED STATES PATENTS

| | | | |
|---|---|---|---|
| 2,602,817 | 7/1952 | Heider | 260/561 R |
| 2,606,207 | 8/1952 | Heider | 260/561 R |
| 3,338,967 | 8/1967 | Potts et al. | 260/561 R X |
| 3,509,212 | 4/1970 | Fonken et al. | 260/561 R |
| 3,530,153 | 9/1970 | Potts et al. | 260/561 R X |

FOREIGN PATENTS OR APPLICATIONS 516,906  1/1953  Belgium ......................... 260/561 R

OTHER PUBLICATIONS

Chem. Abstracts, Vol. 67, 1967, 74725v.
Chem. Abstracts, Vol. 67, 1967, 74726w.

*Primary Examiner*—Lewis Gotts
*Assistant Examiner*—Ethel G. Love
*Attorney, Agent, or Firm*—Cushman, Darby & Cushman

[57] ABSTRACT

N-alkyl formamides or the corresponding N-cycloalkyl or N-aralkyl formamaides are prepared by reacting olefins, cycloolefins or aralkenes with hydrogen cyanide in the Ritter reaction using about 2.5 moles of acid per mole of olefin at a temperature of 30° to 70° C. and the unneutralized acid reaction mixture is extracted with acid stable polar solvents and the extract is worked up in conventional manner.

29 Claims, No Drawings

PROCESS FOR THE PRODUCTION OF PURE N-ALKYL FORMAMIDES

The invention is directed to a process for the production of amides by the so-called Ritter reaction. It especially deals with the continuous separation of N-alkyl and N-cycloalkyl formamides from the reaction solution in the Ritter reaction.

The reaction solutions are formed by the reaction of hydrogen cyanide with the appropriate alcohol or unsaturated hydrocarbon in a strong acid. These types of formamides are employed as printing adjuvants or in the production of textile assistants or are converted into amines.

The formation of the N-alkyl and N-cycloalkyl formamides is known in itself. The procedure is described, for example, by Ritter and Kalisch (J. Amer. Chem. Soc., Vol. 70 (1948), pages 4048–4050) as well as in U.S. Pat. No. 2,773,097. As the acid reaction medium the first citation uses a mixture of acetic acid and sulfuric acid. In the second citation there is used only sulfuric acid in higher concentration. The entire disclosures of the Ritter et al article and U.S. Pat. No. 2,773,097 are hereby incorporated by reference.

Until now, however, there have been considerable difficulties in isolating the substituted formamides produced by the Ritter reaction since it was considered that in order to obtain pure reaction products there must be neutralized the strong acid used as reaction medium and catalyst. Thus for example, according to German Pat. No. 1,196,185 the isolation of the N-alkyl formamide is accomplished by neutralization of the reaction solution and separation of the formamide as the separated phase. The further decomposition to the corresponding amines then takes place for example according to German Pat. No. 1,059,468 by saponification in alkaline medium. The entire disclosure of German Pat. Nos. 1,196,185 and 1,059,468 is hereby incorporated by reference.

Another method is proposed in German Pat. No. 870,856. The intermediate isolation of the formamide is eliminated and the saponification to the amine is carried out in acid solution. In this process, however, the amine can only be set free after the acid is neutralized.

The reaction was previously carried out in such a manner that the acid was used either in equivalent proportions or up to a molar excess of at least 2.5 moles per mole of olefin added in the Ritter reaction.

The yields stated could not be reached again by subsequent workers. There were only obtained yields of about 68–72%. Therefore, the process also has never been carried out industrially.

Furthermore, the reaction mixture in the formation of the formamide was neutralized and then the formamide recovered from the neutralized mixture. By this neutralization, especially when using substantially greater amounts of acid than correspond to the equivalent amount, a considerable portion of the acid becomes lost, besides the formation thereby of such amounts of salt that industrial large scale operation is heavily burdened by working up and further sale. The amount of salt was so large that it could not be sent to the sewage system since it presents too heavy a load.

It has now been found that the yields of N-alkylformamides (or N-cycloalkylformamides or N-arylalkyl formamides) by reactions of an olefin (or cycloolefin or aryl substituted olefin) with hydrogen cyanide in the presence of acid and without formation of salts cannot only reach the yields set forth in German Pat. No. 1,196,185 but they can even exceed them if the molar ratio of olefin to acid is below 1:2.5 and the reaction is carried out at a temperature of 30° to 70° C., whereupon the unneutralized acid reaction mixture is extracted with acid stable, polar solvents. Thus, the molar ratio of olefin to acid can be from 1:2.6 to 1:5. The extracted material is then reclaimed in known manner, for example, by subsequent distillation, in a given case in a vacuum.

It has been found that especially favorable molar ratios of olefin to acid are 1:2.7 to 1:4.

As N-alkyl, N-cycloalkyl and N-aralkyl formamides there can be isolated by the process of the present invention any of those made by the Ritter reaction (see J. Amer. Chem. Soc., Vol. 70, pages 4048–4050 and U.S. Pat. No. 2,773,097) from alcohols or olefins and hydrocyanic acid. These include N-isopropyl formamide, N-sec. butyl formamide, N-t-butyl formamide, N-alpha-methylbenzyl formamide, N-alpha, alpha dimethylbenzyl formamide, amyl formamide, N-t-amyl formamide, N-1-methylcyclohexyl formamide, N-1-methyl hexyl formamide, N-t-hexyl formamide, N-t-octyl formamide, N-sec.-amyl formamide, N-di-t-octyl formamide, N-nonyl formamide, N-1-methyl octyl formamide, N-decyl formamide, N-cyclohexyl formamide, N-cyclopentyl formamide, N-1-methyl nonyl formamide, N-dodecyl formamide and N-1-methylundecyl formamide. Readily producible N-alkyl formamides by the Ritter process are N-isopropyl formamide, N-sec. butyl formamide, N-t-butyl formamide, N-1-methyl amyl formamide, N-t-amyl formamide and above all the N-formamide made from isobutylene, that is, N-t-butyl formamide. Typical olefins include isobutylene, isoamylene, cyclohexene, diisobutylene, 2-methylnonene, 2-methyldodecene.

The aqueous acid solution which is to be extracted can have a pH below pH = 7 within the range of stability of the extracting solvent. The acid used to form the N-alkyl formamide and which is present can be sulfuric acid, a mixture of acetic acid and sulfuric acid hydrochloric acid, phosphoric acid, trifluoroacetic acid, or any other acid which gives the required acidity.

As acid stable polar solvents there can be used tertiary phosphate esters and urea derivatives, preferably tetra substituted ureas and chlorinated hydrocarbons especially in combination with carboxylic acids of saturated hydrocarbons with 1 to 9 carbon atoms.

As phosphate esters there can be used alkyl, aryl and alkaryl phosphates of the general formula:

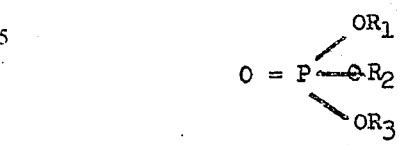

where $R_1$, $R_2$ and $R_3$ are alkyl, aryl and alkaryl groups having a total of 8 to 39 carbon atoms. Thus there can be used tri-butyl phosphate, trioctyl phosphate, tri-2-ethylhexyl phosphate, diphenyl octyl phosphate, tris decyl phosphate, triisodecyl phosphate, diphenyl cresyl phosphate, tris dodecyl phosphate, tris tridecyl phosphate, ethyl dipropyl phosphate, diphenyl isodecyl phosphate, dioctyl phenyl phosphate, tris sec. buty phosphate, tribenzyl phosphate, tri-cyclohexyl phosphate, tri 2,4-xylenyl phosphate, tri 4-butyl-phenyl phosphate, triamyl phosphate, butyl amyl heptyl phosphate. There can be used mixtures of phosphates. Preferred are tributylphosphate or trioctylphosphate.

As urea derivatives there can be used compounds of the formula:

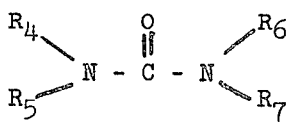

where $R_4$, $R_5$, $R_6$ and $R_7$ individually are alkyl of 1 to 12 carbon atoms (or alkyl substituted by $OR_8$ is alkyl of 1 to 12 carbon atoms) preferably 1 to 5 carbon atoms and $R_4$ and $R_5$ joined together with the adjacent N form a 5 to 6 atom ring having zero or 1 additional O,S or N atom and $R_6$ and $R_7$ together are defined as $R_4$ and $R_5$ together. Examples of preferred substituted ureas are N, N-diethyl-N',N'-dimethylurea and N,N-diethyl-N',-N'-di-n-butyl urea. Other suitable substituted ureas include, N,N-dimethyl carbonyl-N'-morpholine, tetraethyl urea, tetrapropyl urea, tetraisopropyl urea, N,N,N'-trimethyl-N'-ethyl urea, N,N'-dimethyl N,N'-di (dodecyl) urea, N,N'-dimethyl, N,N'-diamyl urea, tetracyclohexyl urea, N,N',N'-trimethyl-N-cyclohexyl urea, N,N'-diethyl N,N'-di (4-methylcyclohexyl) urea, N,N-diethyl carbonyl piperidine, carbodimorpholine, N,N dimethyl carbonyl-N'-thiomorpholine, N,N-diethyl carbonyl N'-oxazolidine, N,N,N'-trimethyl-N'-3-methoxy-n-propyl urea, N,N,N'-trimethyl-2,3,5(or 6)- methyl- 4-methoxy-1-cyclohexyl urea, N-methoxyethyl, N-methyl,N',N'-diethyl urea, N-amyloxymethyl, N,N',N'-trimethyl urea, and N,N-dipropoxypropyl, N',N'-diethyl urea.

There can be used mixtures of phosphates and substituted ureas, as, for example a mixture of tri-n-butyl phosphate and N',N'-diethyl-N'N'-dimethyl urea (e.g., 50:50). As chlorinated hydrocarbons can be used e.g., chloroform and methylene chloride or mixtures thereof. The chlorinated hydrocarbons can be combined with carboxylic acids with 1 to 9 carbon atoms, especially with acetic acid, propionic acid, isobutyric acid, n-valeric acid, caproic acid and trichloroacetic acid or combination of carboxylic acids. Preferred are chloroform, methylenchloride, alone or in combination with acetic acid or isobutyric acid. The amount of polar solvent is given by the distribution coefficient. Unless otherwise indicated all parts and percentages are by weight.

It is not necessary to use the acid stable polar organic solvent alone. Thus up to 50% of the polar organic solvent can be replaced by an aliphatic cycloaliphatic or aromatic hydrocarbon. The hydrocarbon is preferably free of nonbenzenoid unsaturation. The hydrocarbon can have a density of up to 0.90. By this means the density difference between the extraction agent and the solution to be extracted is increased and thereby a quicker phase separation is attained between the extract and the solution to be extracted. For best results sufficient hydrocarbon is added that the density difference between the mixture of hydrocarbon and acid stable polar solvent to the N-alkyl formamide is not smaller than 0.05. Examples of suitable hydrocarbons include hexane, heptane, petroleum ether, benzene, pentane, 2-methylpentane, 3-methyl pentane, 2,2-dimethylbutane, 3-ethyl pentane, n-octane, isooctane, 2,3,4- trimethyl pentane, nonane, decane, cyclohexane, cyclopentane, methyl cyclopentane, methyl cyclohexane, p-menthane, pinane, toluene, o-xylene, m-xylene, p-xylene, mixed xylenes, ethyl benzene, butylbenzene, t-butylbenzene, butyl toluene, mesitylene, cymene, cumene, alkyl benzene mixtures boiling at 158°–186° C or 184°– 202° C.

Room temperature is best suited for the extraction. In general, temperatures of 10° – 35° C. are suitable but lower temperatures to 5° C. can be used or higher temperatures up to 90° C. are also possible, if they do not change the extraction mixture.

If the extraction mixture is so strongly acid that the extraction agent decomposes and thereby the extraction is disturbed the pH can be raised (i.e., the acidity reduced) by diluting the aqueous acid with water to give a weight ratio of acid to water of from 1:0.5 to 1:15 for example. However, as stated above, the reaction medium is always maintained in the acid pH range.

Normally a small part of the acid as well as a correspondingly small part of water based on the total amount of formamide and acid is extracted.

In order to reduce this amount of acid the extract in a given case can be washed with water. The water added for this washing and which contains acid after the washing, can be used before the extraction to dilute the concentrated reaction solution.

The extraction can be carried out in the conventional extraction apparatuses, for example, counter-current extraction columns having packing or plates. As packing there can be used for example, rings (e.g., Raschig rings), saddles (e.g., Berl saddles) or helices made of glass, ceramic or acid resistant metallic materials. As plates there can be used perforated plates, tunnel plates or bubble plates. The reaction solution is generally supplied to the top of the column and the extraction agent is supplied into the sump of the column. To strengthen the extraction efficacy the column can have pulsation.

The recovery of the extraction agent from the extract takes place, as previously mentioned, by distillative separation from the N-substituted formamide, preferably in a vacuum.

To be sure it is already known to extract N-substituted formamides out of the neutralized reaction mixture, for example using diethyl ether (see German Pat. No. 1,196,185). In this case, however, the salt formation (with its technical problems) as mentioned above has already occurred. Diethyl ether moreover is not suited as an extraction agent in the process of the invention.

The technical advantage of the process of the invention consequently is in the possibility of recovering N-alkyl formamide on a large scale industrial basis without simultaneously obtaining considerable amounts of salt as an undesired byproduct. Besides the added amount of acid is used only for the formation of the N-substituted formamide and not for the formation of a byproduct. Simultaneously, however, the N-alkyl formamide is accumulated in greater purity and with very good yields. Until now there have been no attempts to recover N-substituted formamides with these results without neutralization of the reaction solution.

The technical advantage of the process of the invention is in the industrial realizable increase in yields of formamide. At the same time the acid is not consumed by neutralization, but can instead be returned to the starting step of the process.

As previously indicated, the process is also suited for the production of N-cycloalkyl formamide and N-aralkyl formamides.

The invention will be illustrated in Examples 1-10 which collectively were carried out in the following manner.

There were continuously pumped into a 500 ml large double walled vessel supplied with an intensive stirrer and able to be regulated exactly at a fixed temperature by a thermostat 86 weight % sulfuric acid. Isobutylene and hydrogen cyanide were introduced in gaseous form in the molar ratio of 1:1 into the sulfuric acid.

The reaction mixture at 20°C. was led into the middle of an 8 meter long, 40 mm. wide glass column (i.e., 4 meters below the top of the column), filled with 8 mm. Raschig rings (pulsation 2.1 Herz 3 mm. height of stroke). Water was fed in the double amount of the weight of the sulfuric acid to the top of the column and a mixture of tri-n-butyl phosphate and hexane in the proportions of 10:1 were supplied to the sump of the column.

The neutralized extract from this extraction, in a given case, was worked by distillation. Hexane and water were distilled off in a thin layer evaporation at 90°C. operating temperature and 20 Torr. The remaining mixture of tri-n-butyl phosphate and N-t-butyl formamide was so well separated in a packed column (1.20 meters long, 40 mm. diameter, 6 mm. Raschig ring filling) at 1 Torr and 45°C. that more than 99% of the extracted N-t-butylformamide could be isolated. The examples are collected in the following table:

(b) 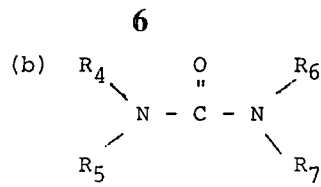

where $R_1$, $R_2$ and $R_3$ are selected from the group consisting of alkyl, aryl and aralkyl groups and $R_1$, $R_2$ and $R_3$ together contain a total of 8 to 39 carbon atoms and $R_4$, $R_5$, $R_6$ and $R_7$ individually are selected from the group consisting of alkyl of 1 – 5 carbon atoms, and c. a chlorinated hydrocarbon selected from the group consisting of chloroform and methylene chloride, and then recovering the extracted formamide.

2. A process according to claim 1 wherein $R_1$, $R_2$, $R_3$ are alkyl.

3. A process according to claim 2, wherein the molar ratio of olefin to acid is between 1:2.6 and 1:5.

4. A process according to claim 1 wherein the molar ratio of olefin to acid is between 1:2.6 and 1:5.

5. A process according to claim 1 wherein the polar organic solvent is selected from the group consisting of:

(a) 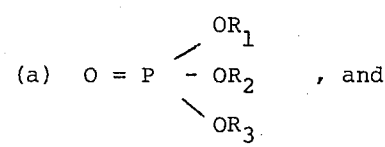 , and

TABLE I

| Example | Feed Mols isoC₄H₈/hr | Reaction Temperature(°C) | Mol Ratio H₂SO₄:i—C₄H₈ | Yield g N-t-butyl formamide/hr | Yield % of Theory |
|---|---|---|---|---|---|
| 1 | 2.5 | 55 | 3.2:1 | 238 | 94 |
| 2 | 2.5 | 40 | 3.2:1 | 218 | 86 |
| 3 | 2.5 | 30 | 3.2:1 | 205 | 81 |
| 4 | 2.5 | 65 | 3.2:1 | 212 | 84 |
| 5 | 2.5 | 55 | 2.8:1 | 225 | 89 |
| 6 | 2.5 | 55 | 2.6:1 | 210 | 83 |
| 7 | 2.5 | 55 | 2.0:1 | 192 | 76 (comparison) |
| 8 | 2.5 | 55 | 3.5:1 | 230 | 91 |
| 9 | 3.75 | 55 | 3.2:1 | 342 | 91 |
| 10 | 1.25 | 55 | 3.1:1 | 119.5 | 95.5 |

What is claimed is:

1. In the process for the production of pure N-alkyl formamide from an olefin by the Ritter reaction, in the presence of a strong acid selected from the group consisting of sulfuric acid, hydrochloric acid, phosphoric acid and trifluoroacetic acid, the improvement comprising:

reacting the olefin with hydrogen cyanide and the acid using a molar ratio of olefin to acid below 1:2.5 at a temperature of 30° to 70° C.; and extracting the unneutralized acid reaction mixture with a polar acid stable organic solvent which is selected from the group consisting of:

(a) 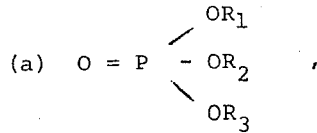

(b) 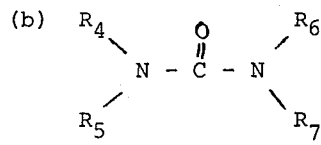

where $R_1$, $R_2$ and $R_3$ are selected from the group consisting of alkyl, aryl and aralkyl groups and $R_1$, $R_2$ and $R_3$ together contain a total of 8 to 39 carbon atoms and $R_4$, $R_5$, $R_6$ and $R_7$ individually are selected from the group consisting of alkyl of 1 – 5 carbon atoms.

6. A process according to claim 5 wherein the molar ratio of olefin to acid is between 1:2.6 and 1:5.

7. A process according to claim 6 wherein $R_1$, $R_2$ and $R_3$ are alkyl.

8. A process according to claim 5 wherein $R_1$, $R_2$ and $R_3$ are alkyl.

9. A process according to claim 1, wherein the olefin is isobutylene and the formamide is N-t-butyl formamide.

10. A process according to claim 1, wherein the molar ratio of olefinic compound to acid is between 1:2.7 and 1:4.

11. A process according to claim 10, wherein the acid is sulfuric acid.

12. A process according to claim 5, wherein the polar solvent is (a).

13. A process according to claim 12, wherein the phosphate ester is the sole extracting solvent.

14. A process according to claim 12, wherein the extracting solvent is a mixture of the phosphate ester and up to 50% of an aliphatic cycloaliphatic or aromatic hydrocarbon having a density up to 0.90.

15. A process according to claim 12, wherein $R_1$, $R_2$ and $R_3$ are each alkyl of 4 to 8 carbon atoms.

16. A process according to claim 12, wherein the olefinic compound is an olefin having at least 4 carbon atoms and the formamide is an N-alkyl formamide.

17. A process according to claim 14, wherein the olefin is isobutylene and the formamide is N-t-butyl formamide.

18. A process according to claim 5, wherein the polar solvent is (b).

19. A process according to claim 18, wherein $R_4$ and $R_5$ are ethyl and $R_6$ and $R_7$ are both methyl or are both butyl.

20. A process according to claim 18, wherein the olefinic compound is an olefin having at least four carbon atoms and the formamide is an N-alkyl formamide.

21. A process according to claim 20, wherein the olefin is isobutylene and the formamide is N-t-butyl formamide.

22. A process according to claim 18, wherein the tetra substituted urea is the sole extracting solvent.

23. A process according to claim 18, wherein the extracting solvent is a mixture of the tetra substituted urea and up to 50% of an aliphatic, cycloaliphatic or aromatic hydrocarbon having a density up to 0.90.

24. A process according to claim 1 wherein the polar solvent is selected from the group consisting of chloroform, methylene chloride, and mixtures thereof with carboxylic acids of saturated hydrocarbons with 1 to 9 carbon atoms.

25. A process according to claim 24 wherein the polar solvent is chloroform.

26. A process according to claim 24 wherein the polar solvent is methylene chloride.

27. A process according to claim 24 wherein the polar solvent is a mixture of chloroform and acetic acid.

28. A process according to claim 24 wherein the polar solvent is a mixture of methylene chloride and acetic acid.

29. A process according to claim 24 wherein the polar solvent is a mixture of chloroform and isobutyric acid.

* * * * *